(12) United States Patent
Montemurro et al.

(10) Patent No.: US 8,818,429 B2
(45) Date of Patent: *Aug. 26, 2014

(54) SYSTEM AND METHOD FOR ENABLING WIRELESS DATA TRANSFER

(71) Applicant: BlackBerry Limited, Waterloo (CA)

(72) Inventors: Michael Peter Montemurro, Toronto (CA); Roger Paul Durand, Amherst, NH (US)

(73) Assignee: BlackBerry Limited, Waterloo (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/911,874

(22) Filed: Jun. 6, 2013

(65) Prior Publication Data
US 2013/0273903 A1 Oct. 17, 2013

Related U.S. Application Data

(63) Continuation of application No. 11/676,642, filed on Feb. 20, 2007, now Pat. No. 8,462,693.

(51) Int. Cl.
*H04W 68/00* (2009.01)
*H04M 1/00* (2006.01)
*H04W 4/00* (2009.01)
*H04L 12/66* (2006.01)

(52) U.S. Cl.
USPC .......... 455/458; 455/552.1; 455/553.1; 370/328; 370/352

(58) Field of Classification Search
USPC ......... 455/458, 552.1, 553.1; 370/328, 352
See application file for complete search history.

(56) References Cited

U.S. PATENT DOCUMENTS

| 6,104,937 | A | 8/2000 | Fujimoto |
| 6,615,033 | B1 | 9/2003 | Cragun |
| 6,691,071 | B2 | 2/2004 | Kerr et al. |
| 6,961,329 | B1 | 11/2005 | Bender et al. |
| 7,068,669 | B2 | 6/2006 | Abrol et al. |

(Continued)

FOREIGN PATENT DOCUMENTS

| CA | 2463904 A1 | 4/2003 |
| EP | 1207654 A2 | 5/2002 |

(Continued)

OTHER PUBLICATIONS

Office Action mailed Aug. 2, 2013, in corresponding Canadian patent application No. 2,678,588.

(Continued)

*Primary Examiner* — Omoniyi Obayanju
(74) *Attorney, Agent, or Firm* — Novak Druce Connolly Bove + Quigg LLP

(57) ABSTRACT

A method of enabling wireless data transfer to an electronic device having a transceiver structured to interact in a first mode with a first wireless network and in a second mode with a second wireless network, including repeatedly powering up the transceiver and enabling the second mode to await receipt of a second beacon signal through the second wireless network, receiving an instance of the second beacon signal with an indication of availability of data to be transferred to the electronic device through the first wireless network, and in response to the receiving of the instance of the second beacon signal with the indication of availability of the data, enabling the first mode to receive the data through the first wireless network.

16 Claims, 8 Drawing Sheets

(56) References Cited

U.S. PATENT DOCUMENTS

| | | |
|---|---|---|
| 7,274,911 B2 | 9/2007 | Li |
| 7,590,091 B2 | 9/2009 | Lee et al. |
| 7,706,796 B2 | 4/2010 | Rimoni et al. |
| 7,916,715 B2 | 3/2011 | Rezaiifar |
| 2002/0016151 A1 | 2/2002 | Romans |
| 2002/0154627 A1* | 10/2002 | Abrol et al. .................. 370/352 |
| 2004/0002330 A1 | 1/2004 | Chitrapu |
| 2004/0165563 A1 | 8/2004 | Hsu et al. |
| 2005/0215260 A1 | 9/2005 | Ahya et al. |
| 2006/0039332 A1 | 2/2006 | Kotzin |
| 2006/0040656 A1 | 2/2006 | Kotzin |
| 2006/0146769 A1 | 7/2006 | Patel et al. |
| 2006/0229053 A1 | 10/2006 | Sivard |
| 2007/0037594 A1 | 2/2007 | Palenius et al. |
| 2007/0197234 A1* | 8/2007 | Gill et al. ..................... 455/458 |
| 2008/0198818 A1 | 8/2008 | Montemurro et al. |

FOREIGN PATENT DOCUMENTS

| | | |
|---|---|---|
| EP | 1578095 A1 | 9/2005 |
| WO | 9909710 | 2/1999 |
| WO | 9909710 A1 | 2/1999 |
| WO | 0122662 A1 | 3/2001 |
| WO | 2005048628 A1 | 5/2005 |
| WO | 2006061692 A | 6/2006 |

OTHER PUBLICATIONS

Office Action mailed Feb. 6, 2012, in corresponding Canadian patent application No. 2,678,576.

Office Action mailed Feb. 28, 2012, in corresponding Canadian patent application No. 2,678,588.

Examination Report mailed Feb. 3, 2011, in corresponding European patent application No. 07102753.6.

Examination Report mailed Feb. 3, 2011, in corresponding European patent application No. 07102751.0.

Advisory Action mailed Jan. 24, 2012, in corresponding U.S. Appl. No. 11/676,639.

Final Office Action mailed Apr. 8, 2013, in corresponding U.S. Appl. No. 11/676,639.

Final Office Action mailed Nov. 14, 2011, in corresponding U.S. Appl. No. 11/676,639.

Notice of Allowance and Fee(s) Due mailed Jun. 25, 2013, in corresponding U.S. Appl. No. 11/676,639.

Non-Final Office Action mailed Sep. 25, 2012, in corresponding U.S. Appl. No. 11/676,639.

First Action Interview Office Action mailed Feb. 28, 2011, in corresponding U.S. Appl. No. 11/676,639.

First Action Interview Pilot Program Pre-Interview Communication mailed Nov. 12, 2010, in corresponding U.S. Appl. No. 11/676,639.

Extended European Search report mailed on Aug. 12, 2011, in corresponding European patent application No. 11175413.

* cited by examiner

SYSTEM AND METHOD FOR ENABLING WIRELESS DATA TRANSFER

CROSS-REFERENCE TO RELATED APPLICATIONS

This application is a continuation of U.S. patent application Ser. No. 11/676,642, filed Feb. 20, 2007, the content of which is incorporated herein by reference.

BACKGROUND

1. Technical Field

The disclosed and claimed concept relates generally to electronic devices interacting with a wireless network and, more particularly, to a system and method for enabling greater power conservation for a wireless handheld device interacting with a wireless network.

2. Description of the Related Art

Wireless networks enabling communications between electronic devices are widely known and have become commonplace. Most widely used are wireless networks based on various recently issued IEEE standards, including and not limited to, 802.11a, 802.11b, 802.11g and 802.16e. Much of the focus in the design of these wireless networks has been providing the convenience of being able to set up a network without the hassles of installing cables (e.g., Ethernet and coax cables). Considerable focus has also been given the use of portable computer systems with these wireless networks where such portable computer systems may actually be in motion and perhaps physically entering and/or exiting a location covered by a wireless network at various times. In response to these considerations, protocols have been developed to repeatedly convey status and other information between devices communicating with each other across a wireless network to, in part, detect the entry and exit of devices into and out of an area covered by the wireless network.

As part of these protocols, it has become commonplace for at least one device engaging in communications in a wireless network, and usually serving as an access point between that wireless network and another network, to repeatedly transmit a beacon or other signal to all of the other devices engaging in communications in that same network. The beacon signal serves multiple purposes, including providing an indication to each of the other wireless devices that the wireless network is still accessible to them, and providing indications of any data to be conveyed to any of the other wireless devices. If one of the other devices suddenly ceases to receive this beacon signal, then it may be an indication to that other device that it has been moved out of the location covered by that particular wireless network and that a search may need to be done to locate another network. If a beacon signal indicates that there is data to be conveyed to one of the other devices, then that other device responds to the beacon signal to cause the data to be transmitted to that other device.

As part of serving the function of enabling wireless devices to determine if a given wireless network is still accessible to them, the specifications followed by many implementations of wireless network require that the beacon signal be transmitted at a relatively short interval of between 100 milliseconds (ms) and 400 ms, though it is commonplace to encounter beacon signals being transmitted every 100 ms to 200 ms. Also, these same specifications also require that each wireless device monitor every transmission of the beacon signal, since any given transmission of a beacon signal may provide an indication of there being data to be conveyed to that wireless device, and if a beacon providing such an indication is not responded to by the wireless device, then the data may be discarded and never conveyed to the wireless device.

Although these relatively short intervals may speed detection by a device of its loss of connection to the wireless network, such short intervals result in a relatively high consumption of power that may not be sustainable by relatively small portable devices for a long period of time with correspondingly small batteries. Such short intervals impair the ability of such portable devices to conserve power by preventing the powering down the RF receiver and processing logic that receives and processes the beacon signal for periods of time long enough to achieve significant power savings.

BRIEF DESCRIPTION OF THE DRAWINGS

A full understanding of the disclosed and claimed concept can be gained from the following Description when read in conjunction with the accompanying drawings in which:

DETAILED DESCRIPTION

The accompanying figures and the description that follows set forth the disclosed and claimed concept in its preferred embodiments. It is, however, contemplated that persons generally familiar with wireless networking devices, as well as other varieties of electronic devices, will be able to apply the novel characteristics of the structures and methods illustrated and described herein in other contexts by modification of certain details. Accordingly, the figures and description are not to be taken as restrictive on the scope of the disclosed and claimed concept, but are to be understood as broad and general teachings.

The following description includes discussions of components of networks, types of networks and interactions between devices through one or more networks. As those skilled in the art will readily recognized, but which is nonetheless stated herein for the sake of clarity, a network is formed by linking together at least two electronic devices by a communications medium. The communications medium serves as a conduit between the two (or more) electronic devices through which one electronic device may transmit a signal to another. The communications medium may be an electrically and/or optically conductive cable forming part of what is called a "wired" network, or the communication medium may be light waves or RF signals forming part of what is called a "wireless" network.

Wireless networks include local area networks (LANs) employing RF signaling that conforms to one of the previously mentioned IEEE 802.11/802.16 standards or other standards. Wireless networks also include cellular networks employing RF signaling that conforms to one of the wide variety of cellular standards, including and not limited to 800 MHz to 900 MHz analog variants, CDMA, EDGE, GSM, TDMA and WCDMA. A network may be segmented such that one electronic device linked to one portion of the network interacts with another electronic device on another portion of the network where the two portions of the network are linked to each other through yet another electronic device. Furthermore, in a segmented network, there may be a combination of wired and wireless portions. Commonplace in many forms of wireless networks is the repeated transmission of some form of beacon signal at a regular interval. As previously discussed, the beacon signal serves multiple purposes, including providing a way for other devices to detect and confirm that they are in communication with a wireless network, and providing a way for wireless devices to be signaled when there is data to be transferred. In some variants of wireless LANs (WLANs), the beacon signal may be referred to as a TIM frame (traffic indication map frame) or a DTIM (delivery traffic indication map). In some variants of cellular network, the beacon signal may be referred to as a page frame.

Figure 1:
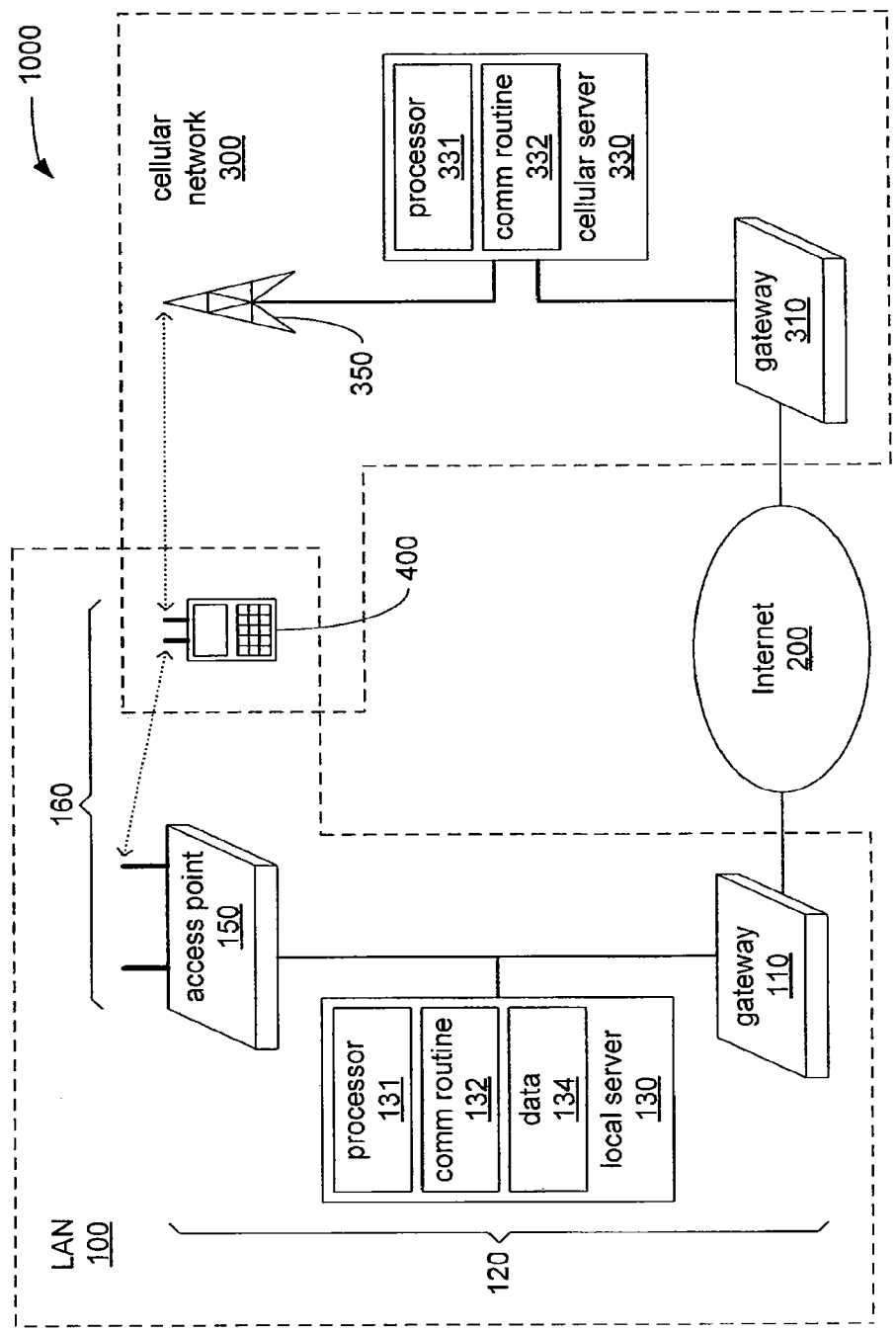
FIG. 1 is a block diagram of an interconnection of networks in accordance with the disclosed and claimed concept.

FIG. 1 depicts a pair of networks 1000, namely a local area network (LAN) 100 and a cellular network 300. As depicted, the LAN 100 and the cellular network 300 are linked via the Internet 200, perhaps via a protocol establishing a virtual private network (VPN). However, as those skilled in the art will readily recognize, the LAN 100 and the cellular network 300 may be linked through any of a number of other possible forms of electronic communication, including and not limited to, a wide area network (WAN), or a dedicated RF or cable linkage. Also as depicted, and as will be explained in greater detail, the LAN 100 and the cellular network 300 both incorporate a common electronic device, namely an electronic device 400.

The LAN 100 may be of any of a vast number of configurations including and not limited to having various combinations of communications media, having any of a wide variety of different electronic devices participating in interactions through the LAN 100, and having any of a number of possible topologies between electronic devices and/or between portions of the LAN 100. However, as depicted in FIG. 1, the LAN 100 incorporates a wireless portion 160 by which electronic devices are linked with RF signals or other wireless communications medium, and a wired portion 120 by which electronic devices are linked through a twisted-pair, coax, fiber optic or other cable-based communications medium. The wired portion 120 and the wireless portion 160 are linked through an access point 150, and the wired portion 120 is linked to the Internet 200 through a gateway 110. The gateway 110 may be any of a variety of possible electronic devices for providing access to the Internet 200, including and not limited to, a DSL MODEM, a cable MODEM, or a fiber optic interface. A local server 130 is also linked to the wired portion 120 and the electronic device 400 is linked to the wireless portion 160. A processor 131 of the local server 130 executes instructions of a communications routine 132 stored within a storage device of the local server 130 that causes the local server 130 to interact with the wired portion 120, and as will be described in greater detail, the processor 131 further causes the local server 130 to participate in transferring data 134 also stored within a storage device of the local server 130 to the electronic device 400.

In the depicted configuration of the LAN 100, the electronic device 400 is able to access the Internet 200 by communicating through the wireless portion 160, the access point 150, the wired portion 120 and the gateway 110. Also, depending on settings programmed into the gateway 110 and/or the functions that the local server 130 has been configured to perform, the local server 130 may be accessible to one or both of the electronic device 400 and another device external to the LAN 100 through the Internet 200. Furthermore, although not depicted in FIG. 1, those skilled in the art will readily understand that still more electronic devices may be linked to either or both of the wired portion 120 and the wireless portion 160, and may interact with one or both of the electronic device 400 and the local server 130, including and not limited to, servers, workstations, network appliances, routers, gateways, access points, modems and portable electronic devices.

Not unlike the LAN 100, the cellular network 300 may be of any of a vast number of configurations including and not limited to having various combinations of communications media, having any of a wide variety of different electronic devices participating in interactions through the cellular network 300, and having any of a number of possible topologies between electronic devices and/or between portions of the cellular network 300. However, as depicted in FIG. 1, the cellular network 300 incorporates at least one transceiver station 350, at least one cellular server 330, and at least one gateway 310. The transceiver station 350 is linked to the cellular server 330, which in turn, is linked to the Internet 200 through the gateway 310. Not unlike the gateway 110, the gateway 310 may be any of a variety of possible electronic devices for providing access to the Internet 200, including and not limited to, a DSL MODEM, a cable MODEM, or a fiber optic interface.

As those skilled in the art will readily recognize, this depiction of the cellular network 300 is highly simplified, since it is physically necessary in creating a cellular network covering any sizable geographic area to have at least a multitude of transceiver stations 350, and likely also a multitude of cellular servers 330 and a multitude of gateways 310. The electronic device 400 is linked to the cellular network 300 through wireless interactions with the transceiver station 350. In the depicted configuration of the cellular network 300, the electronic device 400 is able to access the Internet 200 by communicating through the transceiver station 350, the cellular server 330 and the gateway 310. The cellular server 330 enables this access, in part, by converting between communications protocols used in communicating across the Internet 200 and protocols used in communicating with electronic devices interacting with the transceiver station 350.

Figure 2:
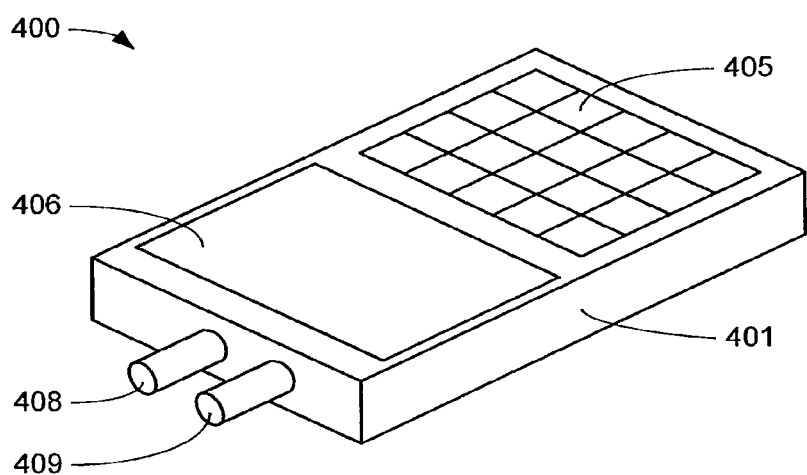
FIG. 2 is a depiction of an improved electronic device in accordance with the disclosed and claimed concept.
Figure 3:
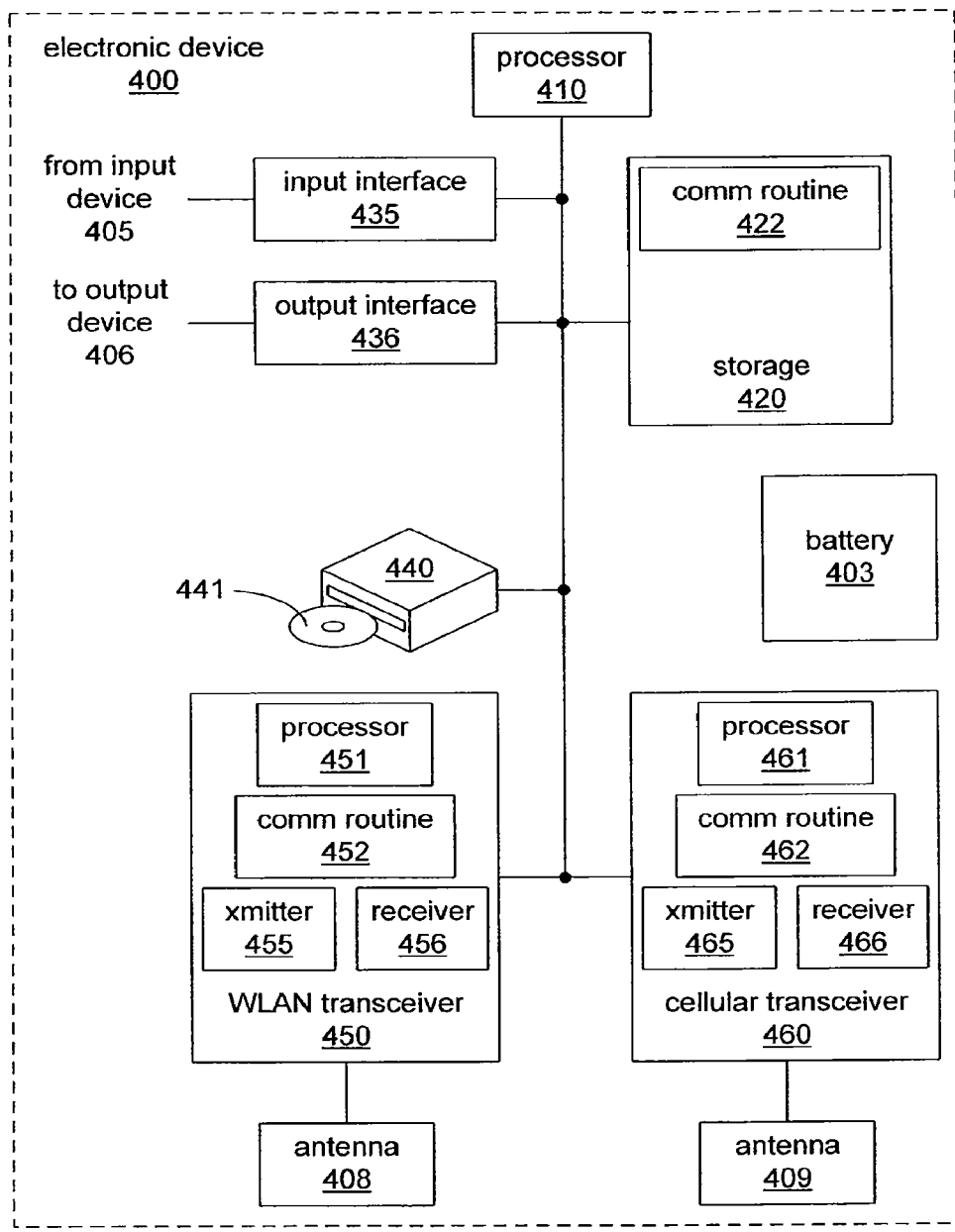
FIG. 3 is a schematic depiction of the improved electronic device of FIG. 2.

An embodiment of the electronic device 400 introduced in FIG. 1 is depicted generally in FIG. 2 and is depicted schematically in FIG. 3. The portable electronic device 400 may be any of a number of possible types of electronic device (e.g. and without limitation, a PDA, a cell phone, a laptop computer, or a device employed in monitoring the status or movement of articles or vehicles in a transportation system). The electronic device 400 incorporates a housing 401 on which may be disposed one or more of a battery 403, an input device 405, an output device 406, a WLAN antenna 408 and a cellular antenna 409. The electronic device 400 also incorporates a processor 410 that may be connected to one or more of a storage 420, an input interface 435 receiving input from the input device 405, an output interface 436 providing output to the output device 406, a media storage device 440 capable of interacting with a storage medium 441 (which may or may not be of removable form), a WLAN transceiver 450 engaging in RF communications through the WLAN antenna 408, and a cellular transceiver 460 engaging in RF communications through the cellular antenna 409. Either the storage 420 or the media storage device 440 may store data and/or sequences of instructions for execution by the processor 410, including and not limited to, a communications routine 422.

The battery 403 may be any of a variety of known single-cell or multi-cell electric power storage devices based on any of a variety of known technologies, including and not limited to lithium-ion, nickel-metal-hydride, or lead-acid. Alternatively, the battery 403 may be substituted with another power source, including and not limited to, a solar-based electric generator, a fuel cell, or a connection to an electric utility.

The processor 410 may be of any of a wide variety of processing devices, including and without limitation, microcontrollers, microprocessors, sequencers, digital signal processors or state machines implemented in hardware logic. In some embodiments, the processor 410 may be one of a number of commercially available processors executing at least a portion of the widely known and used "X86" instruction set and/or another instruction set.

The storage 420 and the media storage device 440 may be of any of a wide variety of types of storage devices, including and without limitation, disk drives (e.g. and without limitation, hard drives, floppy drives, magneto-optical drives, magnetic tape drives or CD-ROM drives), solid state memory (e.g. and without limitation, static RAM, dynamic RAM, ROM, EEPROM or FLASH) and memory card readers. However, in preferred practice, the storage 420 is generally more capable of supporting speedy random accesses than the media storage device 440, and the media storage device 440 is capable of supporting a removable form of the medium 441 while the storage 420 is not meant to provide removable storage. In preferred practice, it is generally intended that the media storage device 440 supports the exchange of data and/or software between the electronic device 400 and another electronic device (not shown) through the storage medium 441.

The input device 405 may be of any of a variety of input devices capable of accepting input from a user of the electronic device 400, including without limitation switches, a keypad, a joystick, a rollerball and/or a touchpad. In embodiments that incorporate the input device 405, the input interface 435 couples the processor 410 to the input device 405 to receive input therefrom. The output device 406 may be of any of a variety of output devices capable of providing information to a user of the electronic device 400, including without limitation lights, a display device, an audible indicator, or a tactile device such as a vibrator mechanism causing the electronic device 400 to vibrate such that a user of the electronic device 400 is able to feel the vibration. In embodiments that incorporate the output device 406, the output interface 436 couples the processor 410 to the input device 405 to provide output thereto. In still other embodiments, the input device 405 and the output device 406 may be a single combined device (e.g. and without limitation, a touch screen).

The WLAN transceiver 450 may be based on any of a wide variety of types of wireless network standards and/or technologies, including and not limited to the previously discussed IEEE 802.11/802.16 series of standards. The cellular transceiver 460 may be based on any of a wide variety of types of cellular communications standards and/or technologies, including and not limited to the previously discussed analog and digital varieties. WLAN transceiver 450 incorporates a processor 451 executing instructions of a communications program 452, a transmitter 455 and a receiver 456. Similarly, the cellular transceiver 460 incorporates a processor 461 executing instructions of a communications program 462, a transmitter 465 and a receiver 466. As those skilled in the art will readily understand, various forms of wireless network and cellular communications technologies employ complex protocols in which advantages may be afforded through the inclusion of a dedicated processor in a transceiver, such as processors 451 and 461, to aid in the efficient handling of such protocols and to allow vendors of transceivers to provide a fully self-contained transceiver that minimizes the need for external devices to perform its function.

Although the WLAN transceiver 450 and the cellular transceiver 460 have been depicted as being entirely separate, those skilled in the art will readily understand that depending on the RF frequencies used by each of the WLAN transceiver 450 and the cellular transceiver 460, as well as other factors, a single converged transceiver may be employed to engage in both wireless network and cellular communications. Embodiments incorporating a converged transceiver are discussed later in greater detail. Furthermore, although the WLAN transceiver 450 and the cellular transceiver 460 have been depicted as employing separate antennae 408 and 409, respectively, those skilled in the art will readily understand that depending on the RF frequencies used by each of the WLAN transceiver 450 and the cellular transceiver 460, as well as other factors, a single converged antenna may be employed for both transceivers in some embodiments. Also, although the antennae 408 and 409 have been depicted as a pair of cylindrical projections protruding from the housing 401, those skilled in the art will readily understand that each of the antennae 408 and 409 (or a converged antenna for both transceivers) may take a variety of physical forms and may or may not be readily viewable from the exterior of the housing 401.

As previously discussed, the electronic device 400 is linked to both the LAN 100 and the cellular network 300 of the pair of networks 1000 depicted in FIG. 1. The WLAN transceiver 450 is employed in communications between the electronic device 400 and the wireless portion 160, and the cellular transceiver 460 is employed in communications between the electronic device 400 and the cellular network 300. As will now be described, data is conveyed through the wireless portion 160 of the LAN 100 to the electronic device 400, taking advantage of the high data rates achievable with the technologies employed in one of the IEEE 802.11/802.16 and other wireless networking standards. However, as will also be described, instead of conveying the signal for the electronic device 400 to exit a sleep mode to receive the data through the wireless portion 160, this signal is conveyed through the cellular network 300, taking advantage of the greater power savings achievable with the protocols employed in various ones of the cellular communications standards.

Transceivers, such as the WLAN transceiver 450 and the cellular transceiver 460 of the electronic device 400, draw a considerable amount of power both when actively engaged in conveying data and when awaiting receipt of a signal coordinating the conveying of data. Therefore, it is desirable to take advantage, where practical, of periods of time when a transceiver does not need to either transfer data or receive coordinating signals to power down the transceiver in an effort to conserve power. In retrieving and executing a sequence of instructions of the communications routine 422, the processor 410 is caused to power down one or both of the WLAN transceiver 450 and the cellular transceiver 460 when not needed in order to conserve the electric power provided by the battery 403. As previously discussed, wireless networks (such as the wireless portion 160 of the LAN 100) typically employ a protocol in which beacon signals are transmitted by one of the electronic devices linked to the wireless network (such as the access point 150) on relatively short intervals of 100 ms to 400 ms in duration. If these beacon signals were relied upon by the electronic device 400 to indicate that there exists data to be conveyed to the electronic device 400 through the wireless portion 160, then the processor 410 would not be able to power down the WLAN transceiver for a period of time longer than the intervals between the transmission of each beacon signal. However, unlike wireless networks where goals such as enabling quick discovery of occurrences of when electronic devices enter or leave a wireless network have led to protocols where such signals as the beacon signal are sent relatively frequently, cellular networks typically employ a much longer interval between transmissions of beacon or other signals serving a similar purpose with a typical interval being as great as 5 seconds to 10 seconds.

Therefore, for at least some transfers of data across the wireless portion 160, including a transfer of the data 134 from the local server 130 to the electronic device 400, the processor 410, in executing a sequence of instructions of the communications program 422, ignores the beacon signal transmitted by the access point 150 at shorter intervals through the wireless portion 160. Instead, the processor 410 employs the beacon signal transmitted at longer intervals by the transceiver station 350 through the cellular network 300. During a time when no transfer of data is occurring across the wireless portion 160, the processor 410 is caused by the communications routine 422 to power down both the WLAN transceiver 450 and the cellular transceiver 460 for a period of time that takes advantage of the longer interval between beacons employed on the cellular network 300. At the end of that period of time, the processor 410 is caused to power up the cellular transceiver 460 to enable the cellular transceiver 460 to await the receipt of a beacon signal through the cellular network 300. It is important to note that the period of time for being powered down must be selected to ensure that there is sufficient time to power up the cellular transceiver 460 for receiving the beacon signal. When received, if the beacon signal does not provide an indication of data to be conveyed to the electronic device 400 through the wireless portion 160, then the processor 410 is caused to power down the cellular transceiver 460 for another period of time appropriate to suit the longer interval between beacons on the cellular network 300.

However, if the beacon signal received through the cellular network 300 provides an indication of data to be conveyed to the electronic device 400 through the wireless portion 160, such as the data 134, then the processor 410 is caused to power up the WLAN transceiver 450 to receive the data through wireless portion 160. Upon being powered up, information from the beacon signal concerning the data to be conveyed through the wireless portion 160 may be transferred by the processor 410 from the cellular transceiver 460 to the WLAN transceiver 450. The processor 410 may further power down the cellular transceiver 460 for another period of time appropriate to suit the longer interval between beacons on the cellular network 300. Upon completion of the transfer of data through the wireless portion 160, the processor 410 may allow the WLAN transceiver 450 to remain powered up long enough to receive a beacon signal through the wireless portion 160 to check for an indication of more data to be transferred across the wireless portion 160 and power down the WLAN transceiver 450 if no such indication is received. Alternatively, upon completion of the transfer of data, the processor 410 may simply power down the WLAN transceiver 450 and rely on the receipt of a beacon signal through the cellular network 300 for the next indication of there being data to be conveyed through the wireless portion 160. In this way, the processor 410 may power down both the WLAN transceiver 450 and the cellular transceiver 460 for periods of time far exceeding the relatively short intervals between beacons on the wireless portion 160, resulting in a considerable savings of power.

As an alternative to solely using the wireless portion 160 to transfer the data, an initial portion of the data may be transferred through the cellular network 300 as the WLAN transceiver 450 is being powered up. More specifically, if the beacon signal received through the cellular network 300 provides an indication of data to be conveyed to the electronic device 400, then the processor 410 may be caused to respond by transmitting a signal through the cellular network indicating that the electronic device 400 is able to accept at least an initial portion of the data through the cellular network 300 during the time that the processor 410 is powering up the WLAN transceiver 450 in preparation for receiving the remainder of the data through the wireless portion 160. With the WLAN transceiver 450 powered up and interacting with the wireless portion 160 such that the WLAN transceiver 450 is able to receive the remainder of the data, the transmission of the initial portion of the data through the cellular network 300 ceases and the remainder of the data is transferred through the wireless portion 160. With the WLAN transceiver 450 taking over the transfer of data, the cellular transceiver 460 may be powered down, or may be allowed to remain powered up at least long enough to receive the next beacon signal transmitted through the cellular network 300 to check for an indication of there being more data to be transferred. Additionally or alternatively, the WLAN transceiver 450 may also be employed to receive a beacon signal transmitted through the wireless portion 160 to check for an indication of there being more data to be transferred.

Although the powering up and the powering down of the WLAN transceiver 450 and the cellular transceiver 460 has been described as being under the control of the processor 410, one or both of the processors 451 and 461 may be involved, either in place or in addition to the processor 410, as will be apparent to those skilled in the art. For example, the processor 461, in executing a sequence of instructions of the communications program 462, may signal the processor 410 of the need to power up the WLAN transceiver 450 upon receipt of a beacon signal providing an indication of there being data to be conveyed through the wireless portion 160, or by way of another example, the processor 461 may directly power up and/or power down the WLAN transceiver 450. Furthermore, one or both of the WLAN transceiver 450 and the cellular transceiver 460 may be capable of powering up at the end of a preset period of time without being signaled by the processor 410 to do so. Therefore, for example, the processor 461 may cause the powering up of the cellular transceiver to await receipt of the beacon signal transmitted through the cellular network 300, and may signal the processor 410 of the receipt of an indication of data to be conveyed through the wireless portion 160 so that the processor 410 may power up the WLAN transceiver 450, or may directly signal the WLAN transceiver 450 to do so.

Figure 4:
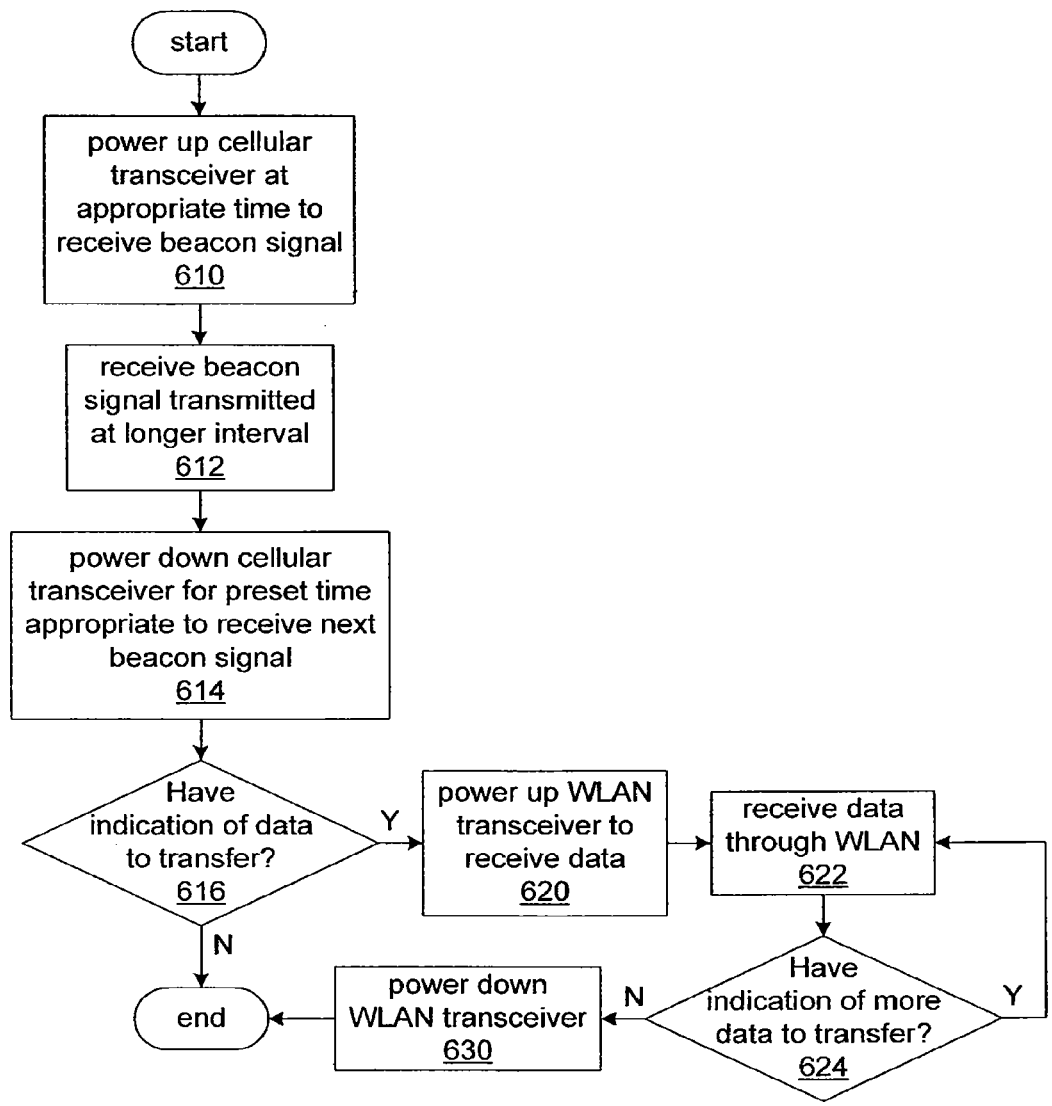
FIG. 4 is a flowchart depicting an embodiment of an improved method in accordance with the disclosed and claimed concept.

FIG. 4 is a flow chart of an embodiment of an electronic device with a WLAN transceiver to communicate data through a WLAN and a cellular transceiver to receive beacon signals through a cellular network providing an indication of there being data to be transferred through the WLAN. At 610, after being powered down for a duration of time, the cellular transceiver is powered up at a time appropriate for it to receive a beacon signal transmitted at an interval through the cellular network. As previously discussed, the interval between beacon signals on a cellular network is typically multiple seconds in duration, while the interval between beacon signals on a WLAN is typically a fraction of a second. Ignoring the beacon signals of the WLAN and employing the beacon signals of the cellular network for at least some transfers of data through the WLAN provides the opportunity to power down one or more transceivers for a longer period of time to realize greater power conservation. At 612, a beacon signal is received through the cellular network, and at 614, the cellular transceiver may be powered down regardless of whether there is data to be transferred through the WLAN, or not.

If at 616, the beacon signal provided an indication of there being data to be transferred through the WLAN, then the WLAN transceiver is powered up at 620, and the data is received at 622. In some embodiments, it may be additionally necessary to transfer information received with the beacon signal about the data to be transferred to the WLAN transceiver to enable receipt of that data at 622. At 624, there may be a check made to determine whether or not there is more data to be transferred through the WLAN. In some embodiments, this check may be made by awaiting receipt of a beacon signal through the WLAN to see if that beacon signal indicates that there is more data to be transferred. In other embodiments, if the cellular transceiver was not powered down at 614, then this check may be made by awaiting receipt of a beacon signal through the cellular network to see if that beacon signal indicates that there is more data to be transferred. Regardless of the exact manner in which the check is carried out, if there is an indication of more data to be transferred, then data transfer again occurs at 622, and possibly followed by another check at 624. However, if no such indication is provided by whatever beacon signals are checked, then at 630, the WLAN transceiver is powered down, and if the cellular transceiver had not been powered down at 614, then it is also powered down, now.

However, if at 616, the beacon signal did not provide an indication of there being data to be transferred through the WLAN, then the WLAN transceiver is not powered up. If in alternate embodiments, the cellular transceiver had not been powered down at 614, then it is powered down, now.

Figure 5:
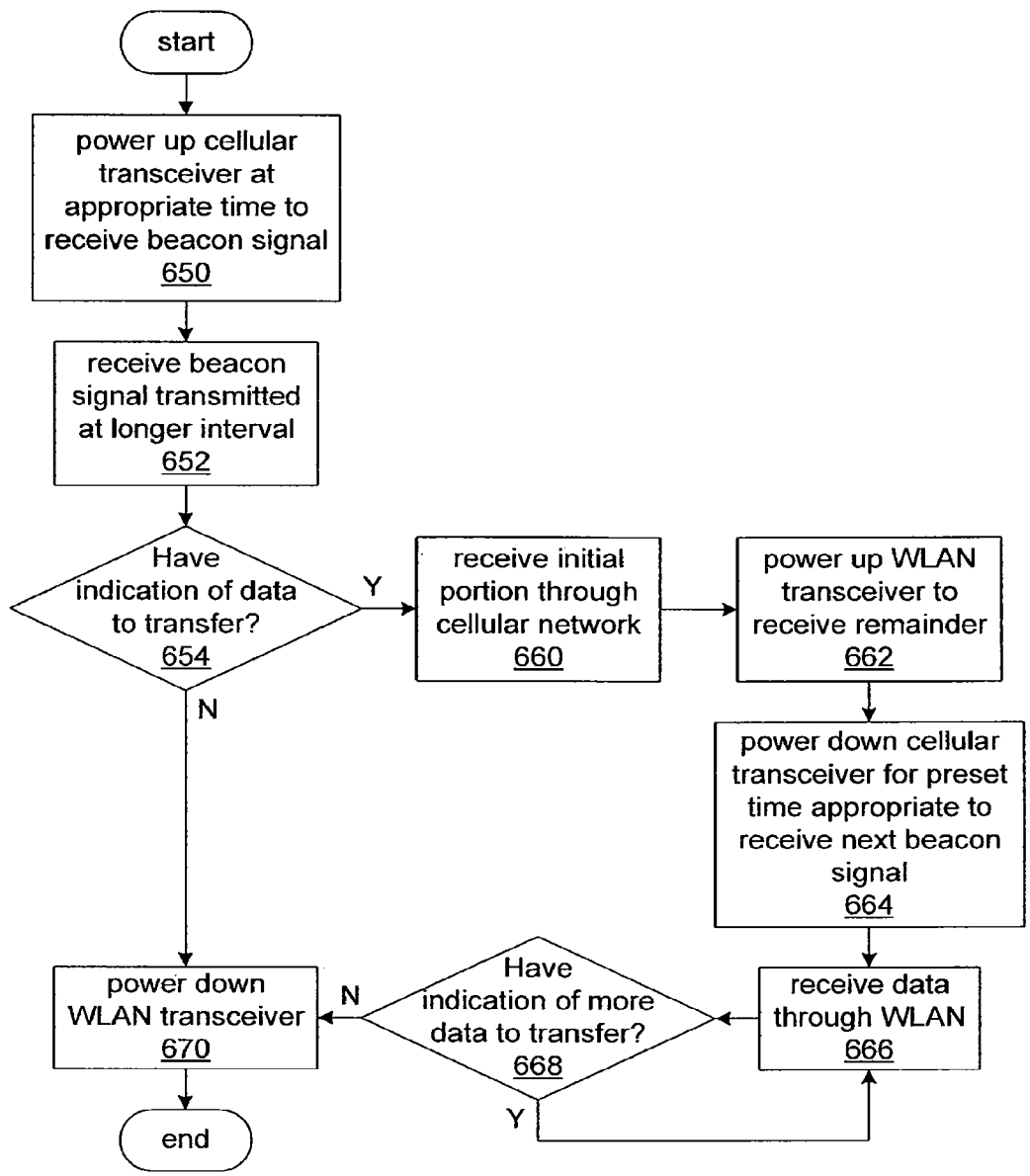
FIG. 5 is a flowchart depicting another embodiment of an improved method in accordance with the disclosed and claimed concept.

FIG. 5 is a flow chart of an embodiment of an electronic device with a WLAN transceiver to communicate data through a WLAN and a cellular transceiver to both receive beacon signals an communicate an initial portion of data through a cellular network providing an indication of there being data to be transferred through the WLAN. At 650, after being powered down for a duration of time, the cellular transceiver is powered up at a time appropriate for it to receive a beacon signal transmitted at an interval through the cellular network. At 652, a beacon signal is received through the cellular network. If at 654, the beacon signal did not provide an indication of there being data to be transferred through the WLAN, then the WLAN transceiver is not powered up, and at 670, cellular transceiver is powered down.

However, if at 654, the beacon signal provided an indication of there being data to be transferred through the WLAN, then in an effort to more quickly begin the transfer of data, an initial portion of the data is transferred through the cellular network at 660 while the WLAN transceiver is powered up at 662. With the WLAN transceiver powered up, the cellular transceiver is powered down at 664 while the remainder of the data is transferred through the WLAN to the WLAN transceiver at 666. In some embodiments, it may be additionally necessary to transfer information received with the beacon signal about the data to be transferred to the WLAN transceiver to enable receipt of that data at 666. At 668, there may be a check made to determine whether or not there is more data to be transferred through the WLAN. In some embodiments, this check may be made by awaiting receipt of a beacon signal through the WLAN to see if that beacon signal indicates that there is more data to be transferred. In other embodiments, if the cellular transceiver was not powered down at 664, then this check may be made by awaiting receipt of a beacon signal through the cellular network to see if that beacon signal indicates that there is more data to be transferred. Regardless of the exact manner in which the check is carried out, if there is an indication of more data to be transferred, then data transfer again occurs at 666, and possibly followed by another check at 668. However, if no such indication is provided by whatever beacon signals are checked, then at 670, the WLAN transceiver is powered down, and if the cellular transceiver had not been powered down at 664, then it is also powered down, now.

As an alternative to the powering down of the cellular transceiver at 664 as WLAN transceiver takes over the task of receiving data and receives the remainder of the data at 666, in an alternate embodiment, there may be a period of time during which both the cellular transceiver and the WLAN transceiver simultaneously receive portions of the data.

Figure 6:
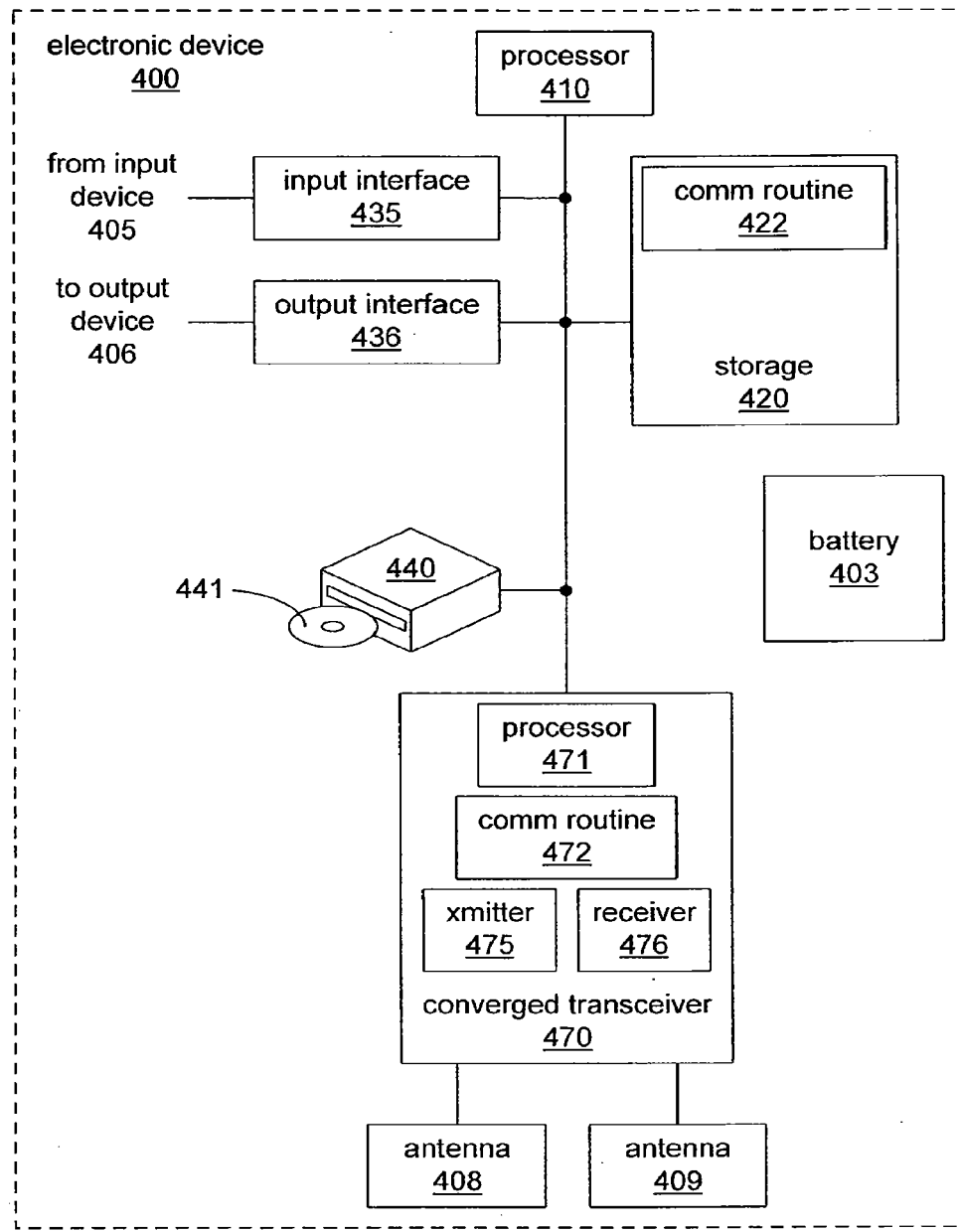
FIG. 6 is an alternate schematic depiction of the improved electronic device of FIG. 2.

An alternate embodiment of the electronic device 400 is depicted schematically in FIG. 6. This alternate electronic device 400 of FIG. 6 is substantially similar to the electronic device 400 of FIG. 3 with the exception that a converged transceiver 470 replaces the combination of separate WLAN transceiver 450 and cellular transceiver 460. The converged transceiver 470 may engage in RF communications employing any of a variety of WLAN and cellular standards and technologies, including and not limited to those specifically named, earlier, with regard to the WLAN transceiver 450 and the cellular transceiver 460. The converged transceiver 470 incorporates a processor 471 executing instructions of a communications program 472, a transmitter 475 and a receiver 476. As previously discussed, transceivers, such as the WLAN transceiver 450 and the cellular transceiver 460 of the electronic device 400, draw a considerable amount of power both when actively engaged in conveying data and when awaiting receipt of a signal coordinating the conveying of data. The converged transceiver 470 is no exception.

Therefore, for at least some transfers of data across the wireless portion 160, the processor 410, in executing a sequence of instructions of the communications program 422, ignores the beacon signal transmitted by the access point 150 at shorter intervals through the wireless portion 160, and instead, employs the beacon signal transmitted at longer intervals by the transceiver station 350 through the cellular network 300. During a time when no transfer of data is occurring across the wireless portion 160, the processor 410 is caused by the communications routine 422 to power down both the converged transceiver 470 for a period of time appropriate to suit the longer interval between beacons employed on the cellular network 300. At the end of that period of time, the processor 410 is caused to power up the converged transceiver 470 to enable the converged transceiver 470 to await the receipt of a beacon signal through the cellular network 300. In embodiments where the converged transceiver 470 may be capable of engaging in RF communications with both the wireless portion 160 and the cellular network 300, simultaneously, the processor 410 may signal the converged transceiver 470 to at least initially operate solely as a cellular transceiver upon powering up the converged transceiver 470 to conserve power. When received, if the beacon signal does not provide an indication of data to be conveyed to the electronic device 400 through the wireless portion 160, then the processor 410 is caused to power down the converged transceiver 470 for another period of time appropriate to suit the longer interval between beacons on the cellular network 300.

However, if the beacon signal received through the cellular network 300 provides an indication of data to be conveyed to the electronic device 400 through the wireless portion 160, then the processor 410 is caused to signal the converged transceiver 470 to interact with the wireless portion 160 of the LAN 100 as a WLAN transceiver to receive the data through wireless portion 160. The processor 410 may signal the converged transceiver 470 to employ information conveyed with the beacon signal about the data to be conveyed through the wireless portion 160. In embodiments where the converged transceiver 470 may be capable of engaging in RF communications with both the wireless portion 160 and the cellular network 300, simultaneously, the processor 410 may signal the converged transceiver 470 to operate solely as a WLAN transceiver to conserve power during the transfer of data. Upon completion of the transfer of data through the wireless portion 160, the processor 410 may allow the converged transceiver 470 to remain powered up long enough to receive a beacon signal through the wireless portion 160 to check for an indication of more data to be transferred across the wireless portion 160 and power down the converged transceiver 470 if no such indication is received. Alternatively, upon completion of the transfer of data, the processor 410 may simply power down the converged transceiver 470 until an appropriate time to power up the converged transceiver 470 to receive another beacon signal through the cellular network 300. In this way, the processor 410 may power down the converged transceiver 470 for periods of time far exceeding the relatively short intervals between beacons on the wireless portion 160, resulting in a considerable savings of power.

Although the powering up and the powering down of the converged transceiver 470 has been described as being under the control of the processor 410, one or both of the processor 471 may be involved, either in place or in addition to the processor 410, as will be apparent to those skilled in the art. For example the converged transceiver 470 may be capable of powering up at the end of a preset period of time without being signaled by the processor 410 to do so. Therefore, for example, in executing a sequence of instruction of the communications program 472, the processor 471 may cause the powering up of the converged transceiver to await receipt of the beacon signal transmitted through the cellular network 300, and may signal the processor 410 of the receipt of an indication of data to be conveyed through the wireless portion 160.

Figure 7:
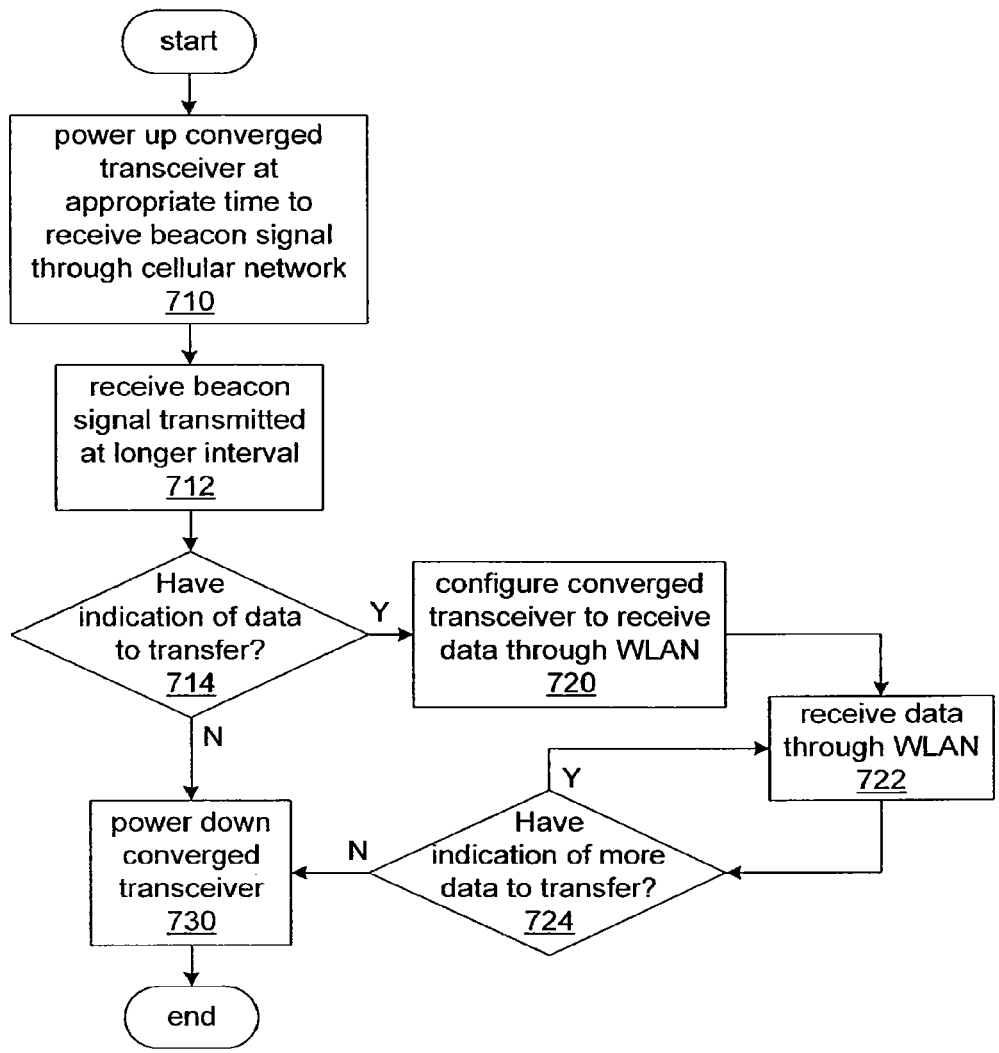
FIG. 7 is another flowchart depicting an embodiment of an improved method in accordance with the disclosed and claimed concept.

FIG. 7 is a flow chart of an embodiment of an electronic device with a converged transceiver able to at least communicate data through a WLAN and able to at least receive beacon signals through a cellular network providing an indication of there being data to be transferred through the WLAN. At 710, after being powered down for a duration of time, the converged transceiver is powered up at a time appropriate for it to receive a beacon signal transmitted at an interval through the cellular network. At 712, a beacon signal is received through the cellular network.

If at 714, the beacon signal did not provide an indication of there being data to be transferred through the WLAN, then the converged transceiver is powered down at 730. However, if at 714, the beacon signal provided an indication of there being data to be transferred through the WLAN, then the converged transceiver is configured to receive data through the WLAN at 720. In embodiments where the converged transceiver is able to interact with only one or the other of the WLAN and the cellular network at a time and must be switched between a WLAN mode and a cellular mode, respectively, configuring the converged transceiver may entail signaling it to switch from the cellular mode in which it was originally powered up to the WLAN mode for the transfer of data. In embodiments where the converged transceiver is able to interact with both the WLAN and the cellular network, simultaneously, configuring the converged transceiver may entail signaling it to begin WLAN communications. At 722, the data is received through the WLAN.

At 724, there may be a check made to determine whether or not there is more data to be transferred through the WLAN. In some embodiments, this check may be made by awaiting receipt of a beacon signal through the WLAN to see if that beacon signal indicates that there is more data to be transferred. In other embodiments, this check may be made by awaiting receipt of a beacon signal through the cellular network to see if that beacon signal indicates that there is more data to be transferred. Regardless of the exact manner in which the check is carried out, if there is an indication of more data to be transferred, then data transfer again occurs at 722, and possibly followed by another check at 724. However, if no such indication is provided by whatever beacon signals are checked, then at 730, the converged transceiver is powered down.

Such use of both the wireless portion 160 of the LAN 100 and the cellular network 300 by any embodiment of the electronic device 400 requires some degree of coordination to send beacon signals through the cellular network 300 indicating that there is data to be conveyed through the wireless portion 160. FIG. 1 depicts an embodiment to support such coordinated activity. A cellular network, such as the cellular network 300, is typically operated by a provider of cellular communications services, and would typically incorporate one or more servers, such as the cellular server 330, to enable data services for their customers. A local area network, such as the LAN 100 with both the wired portion 120 and the wireless portion 160, is typically operated by a business, and would typically incorporate one or more local servers, such as the local server 130, to provide email and/or other services for their personnel.

As those skilled in the art will readily recognize, such coordination between two wireless networks (namely the wireless portion 160 and the cellular network 300) operated by different entities entails agreed-upon cooperation between those two entities. An example of such cooperation may be a business operating the LAN 100 engaging a cellular communications provider operating the cellular network 300 to coordinate the operation of their networks through signaling through the Internet 200 to the transmission of beacon signals through the cellular network 300 to devices such as the electronic device 400 indicating the availability of data through the wireless portion 160.

More particularly, to enable the transfer of data 134 from the local server 130 to the electronic device 400 through the wireless portion 160, the processor 131 of the local server 130 executes a sequence of instructions of the communications routine 132 to signal the cellular server 330 to transmit a beacon signal indicating the availability of the data 134. A processor 331 of the cellular server 330 executes a sequence of instructions of a communications routine 332 stored within a storage device of the cellular server 330, thereby causing the cellular server 330 to await the receipt of the signal from the local server 130 to send a beacon signal through the cellular network 300 to a device such as the electronic device 400. Upon receiving the signal sent through the Internet 200 by the local server 130, the processor 331 is caused to respond by transmitting such a beacon signal to the electronic device 400 indicating that the data 134 is available to be transferred through the wireless portion 160 to the electronic device 400.

Once the electronic device 400 responds to the receipt of the beacon signal by interacting through the wireless portion 160 so that the electronic device 400 becomes accessible to the local server 130, the local server 130 transmits the data 134 to the electronic device 400. The beacon signal transmitted through the cellular network 300 may incorporate information concerning the data 134, including and not limited to, an identifier of either the data or of another device to enable the electronic device 400 to enable the transfer, such as either the access point 150 or the local server 130. Such information may be provided to the cellular server 330 for transmission in the beacon signal by way of the signal sent by the local server 130 to the cellular server 330.

In such an arrangement between the local server 130 and the cellular server 330, the communications routine 132 may cause the processor 131 of the local server 130 to maintain a list of which of the devices linked to the wireless portion 160 employ such a coordinated use of two wireless networks for the transfer of data. Alternatively, it may be the access point 150 that maintains such a list and/or sends the signal to the cellular server 330 to cause the transmission of a beacon signal indicating the availability of the data 134. In such an embodiment, the access point 150 may receive from the local server 130 the data 134 to be transmitted to devices linked to the wireless portion 160, and a processor (not shown) of the access point 150 executing instructions of a communications program (not shown) of the access point 150 may employ such a list to differentiate between devices to which such a beacon signal is to be sent and devices not employing such a beacon signal. The access point 150 would signal the cellular server 330 to transmit such beacons when appropriate.

Figure 8:
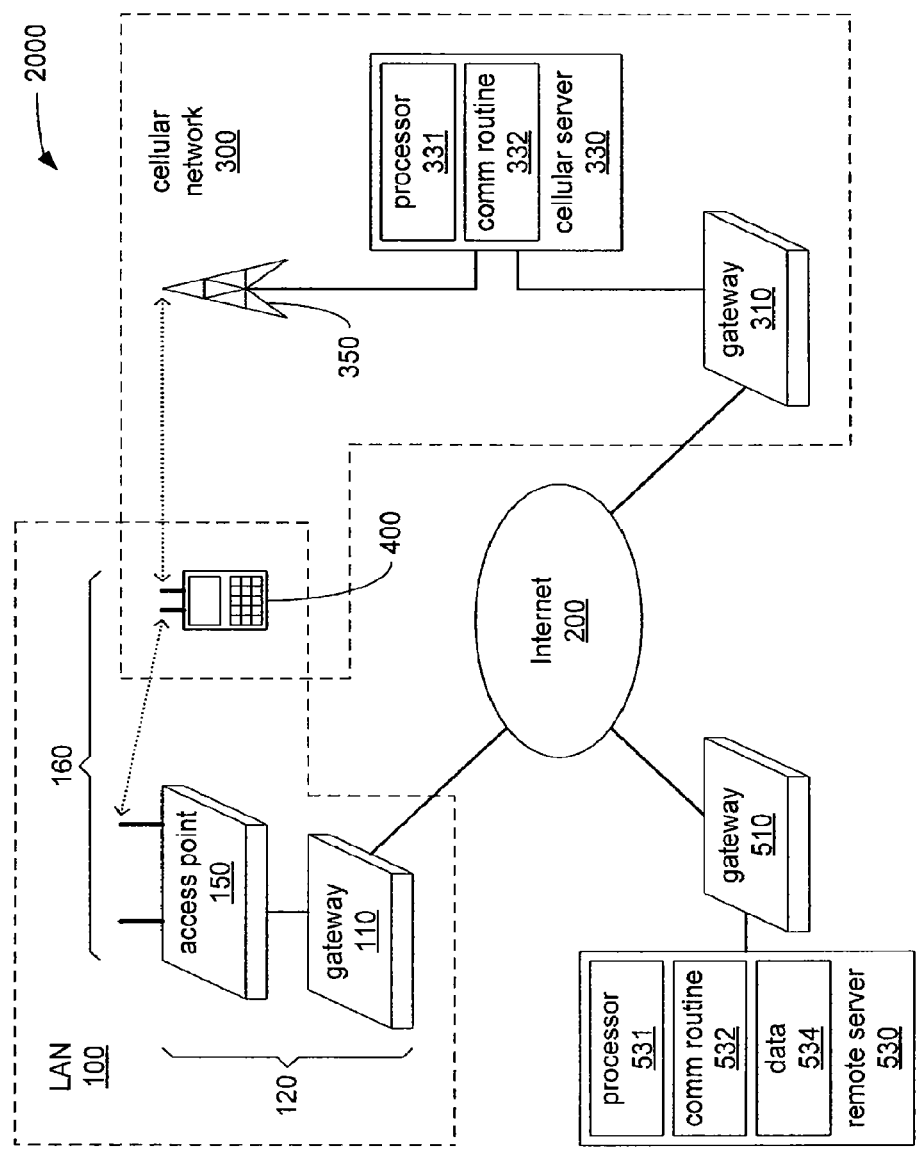
FIG. 8 is a block diagram of another interconnection of networks in accordance with the disclosed and claimed concept.

FIG. 8 depicts another example embodiment to support such coordinated activity. The combination of the pair of networks 2000 and the Internet 200 of FIG. 8 is substantially similar to the combination of the pair of networks 1000 and the Internet 200 of FIG. 1. The principal difference is that the data to be transferred to the electronic device 400 is data 534 stored within a storage device of a remote server 530 outside of the LAN 100 and linked to the Internet 200 via a gateway 510, instead of the data 134 of the local server 130 within the LAN 100.

Again, a cellular network, such as the cellular network 300, is typically operated by a provider of cellular communications services, and a local area network, such as the LAN 100 with both the wired portion 120 and the wireless portion 160, is typically operated by a business. The remote server 530 may be operated by a provider of a data transfer service to enable the transfer of data to an electronic device such as the electronic device 400 (for example, a manufacturer of at least a portion of the electronic device 400), or the remote server 530 may be operated by the same business as is operates the LAN 100, but from a location remote to that of the LAN 100.

Again, achieving coordination between two wireless networks (namely the wireless portion 160 and the cellular network 300) and a remote server operated by different entities entails agreed-upon cooperation. An example of such cooperation may be a business operating the LAN 100 engaging a data transfer services provider operating the remote server 530 that in turn, engages a cellular communications provider operating the cellular network 300 to coordinate the transfer of data, such as the data 534, from the remote server 530 to the electronic device 400.

More particularly, to enable the transfer of data 534 from the remote server 530 to the electronic device 400 through the wireless portion 160, a processor 531 of the remote server 530 executes a sequence of instructions of a communications routine 532 stored within a storage device of the remote server 530 to signal the cellular server 330 to transmit a beacon signal indicating the availability of the data 534. In a manner very much like what was discussed with regard to FIG. 1, the processor 331 of the cellular server 330 executes a sequence of instructions of the communications routine 332, thereby causing the cellular server 330 to await the receipt of the signal from the remote server 530 to send a beacon signal through the cellular network 300 to a device such as the electronic device 400. Upon receiving the signal sent through the Internet 200 by the remote server 530, the processor 331 is caused to respond by transmitting such a beacon signal to the electronic device 400 indicating that the data 534 is available to be transferred through the wireless portion 160 to the electronic device 400.

Once the electronic device 400 responds to the receipt of the beacon signal by interacting through the wireless portion 160 so that the electronic device 400 becomes accessible to the remote server 530, the remote server 530 transmits the data 534 to the electronic device 400. The beacon signal transmitted through the cellular network 300 may incorporate information concerning the data 534, including and not limited to, an identifier of either the data or of another device to enable the electronic device 400 to enable the transfer, such as either the access point 150, the gateway 510 or the remote server 530. Such information may be provided to the cellular server 330 for transmission in the beacon signal by way of the signal sent by the remote server 530 to the cellular server 330. In such an arrangement between the remote server 530 and the cellular server 330, the communications routine 532 may cause the processor 531 of the remote server 130 to maintain a list of which of the electronic devices, that like electronic device 400, employ such a coordinated use of two wireless networks for the transfer of data.

It should be noted that although FIGS. 1 and 8 depict the use of the Internet 200 to, for example, convey signals to the cellular server 330 to cause the transmission of appropriate beacon signals, other linkages for conveying such signals could be employed. Specifically, and as previously discussed, virtual private networks, dedicated cable-based connections, dedicated wireless connections (e.g. and without limitation, satellite and microwave beam linkages between corporate facilities), and other alternatives may be employed to allow the local server 130, the access point 150 and/or another device of the LAN 100 to signal the cellular server 330 to send an appropriate beacon signal.

In accordance with one aspect of the present disclosure, there is provided a local server comprising a processor configured to execute a communications routine that when executed causes the local server to: signal a cellular server to transmit a beacon signal through a cellular network, the beacon signal indicating the availability of data for an electronic device on the local server; receive a response, from the electronic device, to receipt of the beacon signal indicating the availability of data; and transmit the data to the electronic device through the local network.

In accordance with another aspect of the present disclosure, there is provided a method of transmitting data to an electronic device from a local server, the method comprising: the local server signalling a cellular server to transmit a beacon signal through a cellular network, the beacon signal indicating the availability of data for the electronic device on the local server; the local server receiving, from the electronic device, a response to receipt of the beacon signal indicating the availability of data; and the local server transmitting the data to the electronic device through the local network.

In accordance with a further aspect of the present disclosure, there is provided a method of enabling wireless data transfer to an electronic device having a transceiver structured to interact in a first mode with a first wireless network wherein a first beacon signal is repeatedly transmitted at a first interval and further structured to interact in a second mode with a second wireless network wherein a second beacon signal is repeatedly transmitted at a second interval that is longer than the first interval, the method comprising: repeatedly powering up the transceiver and enabling the second mode to await receipt of the second beacon signal through the second wireless network; receiving an instance of the second beacon signal with an indication of availability of data to be transferred to the electronic device through the first wireless network; and in response to the receiving of the instance of the second beacon signal with the indication of availability of the data, enabling the first mode to receive the data through the first wireless network.

In accordance with yet a further aspect of the present disclosure, there is provided an electronic device having a transceiver structured to interact in a first mode with a first wireless network wherein a first beacon signal is repeatedly transmitted at a first interval, and structured to interact in a second mode with a second wireless network wherein a second beacon signal is transmitted at a second interval that is longer than the first interval, having a communications routine stored within a storage that when executed by a processor causes the processor to be structured to: repeatedly power up the transceiver to await receipt of the second beacon signal through the second wireless network; receive an instance of the second beacon signal with an indication of availability of data to be transferred to the electronic device through the first wireless network; and in response to the receiving of the instance of the second beacon signal with the indication of availability of the data, enable the first mode to receive data through the first wireless network.

As those skilled in the art will readily recognize, various services that could be provided through a network may lend themselves to being performed through such a coordinated mechanism for transferring data, including and without limitation, push email and instant messaging. Other services that would not be unduly adversely affected by the inherent delay in transmission caused by the long intervals between beacon transmissions that are typical of a cellular network may also be carried out in the manner described herein.

While specific embodiments of the disclosed and claimed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed and claimed concept which is to be given the full breadth of the claims appended and any and all equivalents thereof.

The invention claimed is:

1. A local server of a local area network, the server comprising a processor configured to execute a communications routine that when executed causes the local server to:
   signal a cellular server to transmit a beacon signal through a cellular network, the beacon signal indicating the availability of data for an electronic device on the local server, and the beacon signal being transmitted as part of a first set of beacon signals that are repeatedly transmitted at a first interval, a second set of beacon signals being repeatedly transmitted by an access point of the local area network at a second interval shorter than the first interval;
   receive, from the electronic device, a response to receipt of the beacon signal indicating the availability of data on the local server; and
   transmit the data to the electronic device through the local area network.

2. The local server of claim 1 wherein the communications routine causes the processor to signal the cellular server to incorporate information concerning the data in the beacon signal indicating the availability of data.

3. The local server of claim 2 wherein the information concerning the data includes an identifier of the data.

4. The local server of claim 2 wherein the information concerning the data includes an identifier of another device to enable transfer of the data.

5. The local server of claim 1 configured to cause an access point to transmit beacon signals over the local area network.

6. The local server of claim 1 wherein the communications routine causes the processor to maintain a list of electronic devices linked to the local server that employ the cellular network to receive beacons indicating the availability of data.

7. A method of transmitting data to an electronic device from a local server of a local area network, the method comprising:
   the local server signalling a cellular server to transmit a beacon signal through a cellular network, the beacon signal indicating the availability of data for the electronic device on the local server, and the beacon signal being transmitted as part of a first set of beacon signals that are repeatedly transmitted at a first interval, a second set of beacon signals being repeatedly transmitted by an access point of the local area network at a second interval shorter than the first interval;
   the local server receiving, from the electronic device, a response to receipt of the beacon signal indicating the availability of data on the local server; and
   the local server transmitting the data to the electronic device through the local area network.

8. The method of claim 7 further comprising the cellular server transmitting the beacon signal indicating the availability of data.

9. The method of claim 7 further comprising the electronic device transmitting, to the local server, a response to the beacon signal indicating the availability of data.

10. The method of claim 7 further comprising the electronic device powering down during the first interval.

11. The method of claim 7 further comprising the local server signalling the cellular server to incorporate information concerning the data in the beacon signal indicating the availability of data.

12. The method of claim 11 wherein the information concerning the data includes an identifier of the data.

13. The method of claim 11 wherein the information concerning the data includes an identifier of another device to enable transfer of the data.

14. The method of claim 7 further comprising the local server causing an access point to transmit beacon signals over the local area network.

15. The method of claim 7 further comprising the local server maintaining a list of electronic devices linked to the local server that employ the cellular network to receive beacons indicating the availability of data.

16. The method of claim 7 further comprising the cellular network simultaneously transmitting a portion of the data for a period of time while the local server is transmitting the data.

* * * * *